United States Patent [19]
Nordberg et al.

[11] Patent Number: 5,274,318
[45] Date of Patent: Dec. 28, 1993

[54] PORTABLE WIRELESS COMMUNICATION UNIT AND METHOD OF USING SAME

[76] Inventors: Svein T. Nordberg, 8851 Alphecca Way, San Diego, Calif. 92126; David B. Rose, 3822 Mt. Acadia Blvd., San Diego, Calif. 92111

[21] Appl. No.: 922,199
[22] Filed: Jul. 30, 1992
[51] Int. Cl.$^5$ ............................. H02J 7/00; A45F 5/02
[52] U.S. Cl. ........................................ 320/2; 224/242; 224/252
[58] Field of Search ................ 320/2; 224/192, 197, 224/246, 904, 252, 242; D13/103; 455/351

[56] References Cited

U.S. PATENT DOCUMENTS

| | | | |
|---|---|---|---|
| 3,956,701 | 5/1976 | James, Jr. et al. | 224/252 X |
| 4,083,481 | 4/1978 | Selinko | 224/252 |
| 4,485,946 | 12/1984 | Liautaud et al. | 224/242 |
| 4,677,362 | 6/1987 | House, II et al. | 320/2 |
| 4,828,153 | 5/1989 | Guzik et al. | 224/242 |

Primary Examiner—R. J. Hickey

[57] ABSTRACT

Briefly, the above and further objects of the present invention are realized by providing a portable wireless communication unit having an electronic communication device with an integrally formed U-shaped frame housing mounted externally thereto. A power pack for supplying electrically power to the communication device, is adapted to be mounted removably latchably within the frame housing. The power pack includes an apparel clip mounted externally to one of the power pack faces for enabling the communication unit to be supported from the wearing apparel of a user. A resilient spring finger disposed on the power pack is latchably received within a groove disposed in the frame housing, to retain releasably, the power pack in a confronting relationship within the frame. An integrally formed flange forming part of the power pack, cooperates with an elongated slit-like groove in the frame housing to facilitate the proper alignment of the power pack when received within the frame housing.

14 Claims, 3 Drawing Sheets

PORTABLE WIRELESS COMMUNICATION UNIT AND METHOD OF USING SAME

TECHNICAL FIELD

The present invention relates in general to wireless communication units and method of using them, and it more particularly relates to a new and improved portable wireless communication unit having a power pack adapted for rapid and easy replacement thereof.

BACKGROUND ART

Conventional wireless communication units are generally equipped with batteries which are stored within a battery compartment located internally within the communication unit. Such a battery compartment usually includes a removable cover so that batteries within the unit may be easily accessed for replacement purposes. In this regard, once the battery cover is removed, the user may then replace the batteries.

In order to replace such batteries, the user must first remove the old batteries and replace them with new batteries making certain the polarity poles of each new battery cell is properly aligned within the compartment. In this regard, the user generally refers to a schematic diagram within the compartment or on the removed battery cover. Such diagrams however, are typically difficult to read, and thus, the user many times improperly installs the batteries within the compartment. Thus, oftentimes, the unit will continue to remain inoperable until the batteries are properly placed within the compartment.

In those situations where the user is not familiar with electronic symbols indicative of battery pole polarities, the user is unable to replace such batteries without assistance. Thus, additional time is required to replace the batteries while the user seeks assistance from another person who is familiar with such symbols.

Because of the aforementioned difficulties, the replacement of such batteries in a portable communication unit can not only result in improperly installed batteries but can also result in excessive periods of time when the communication unit is inoperable.

Another problem associated with such battery arrangements is the possible dislodgement of the batteries from their compartment once they have been replaced. In this regard, batteries are generally held in place by inserting the battery cover over a battery compartment opening and engaging the cover with part of the electronic device housing to secure the batteries within the compartment.

While the above-mentioned arrangement is generally satisfactory when the communication unit is maintained in a stationary manner, such an arrangement has not proven entirely satisfactory when the communication unit is transported from place to place by a user. In this regard, the communication unit with the batteries therein is usually supported by the wearing apparel of a user via an apparel clip. However, because such batteries are generally quite heavy, whenever the user bends over, the clip will come loose causing the communication unit to fall to the ground. In such circumstances, the batteries many times will exert a sufficient force against the battery cover to cause the cover to become jarred loose when the communication unit is jarred abruptly. Therefore, once the cover is loose, the batteries can be easily dislodged from their compartment.

Therefore, it would be highly desirable to have a wireless communication unit which addresses the above-mentioned problems, and which provides adequate and relatively inexpensive solutions thereto. Such a wireless communication unit should have batteries that can be easily and quickly replaced without the need of referring to difficult and complex circuit diagrams. The batteries should also be secured adequately, so that, even if the user is jarred or bumped abruptly, the batteries will not be dislodged from the unit.

DISCLOSURE OF INVENTION

Therefore, it is the principal object of the present invention to provide a new and improved wireless communication unit, which has batteries which can be replaced easily and quickly without referring to circuit diagrams for replacement purposes.

Another object of the present invention is to provide such a new and improved wireless communication unit with batteries that are secured adequately so that they will not be dislodged from the unit, even if the user is jarred or bumped abruptly.

Briefly, the above and further objects of the present invention are realized by providing a portable wireless communication unit having an electronic communication device with an integrally formed U-shaped frame housing mounted externally thereto. A power pack for supplying electrically power to the communication device, is adapted to be mounted removably latchably within the frame housing. The power pack includes an apparel clip mounted externally to one of the power pack faces for enabling the communication unit to be supported from the wearing apparel of a user.

A resilient spring finger disposed on the power pack is latchably received within a groove disposed in the frame housing, to retain releasably, the power pack in a confronting relationship within the frame. An integrally formed flange forming part of the power pack, cooperates with an elongated slit-like groove in the frame housing to facilitate the proper alignment of the power pack when received within the frame housing.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein.

BEST MODE FOR CARRYING OUT THE INVENTION

Figure 1:
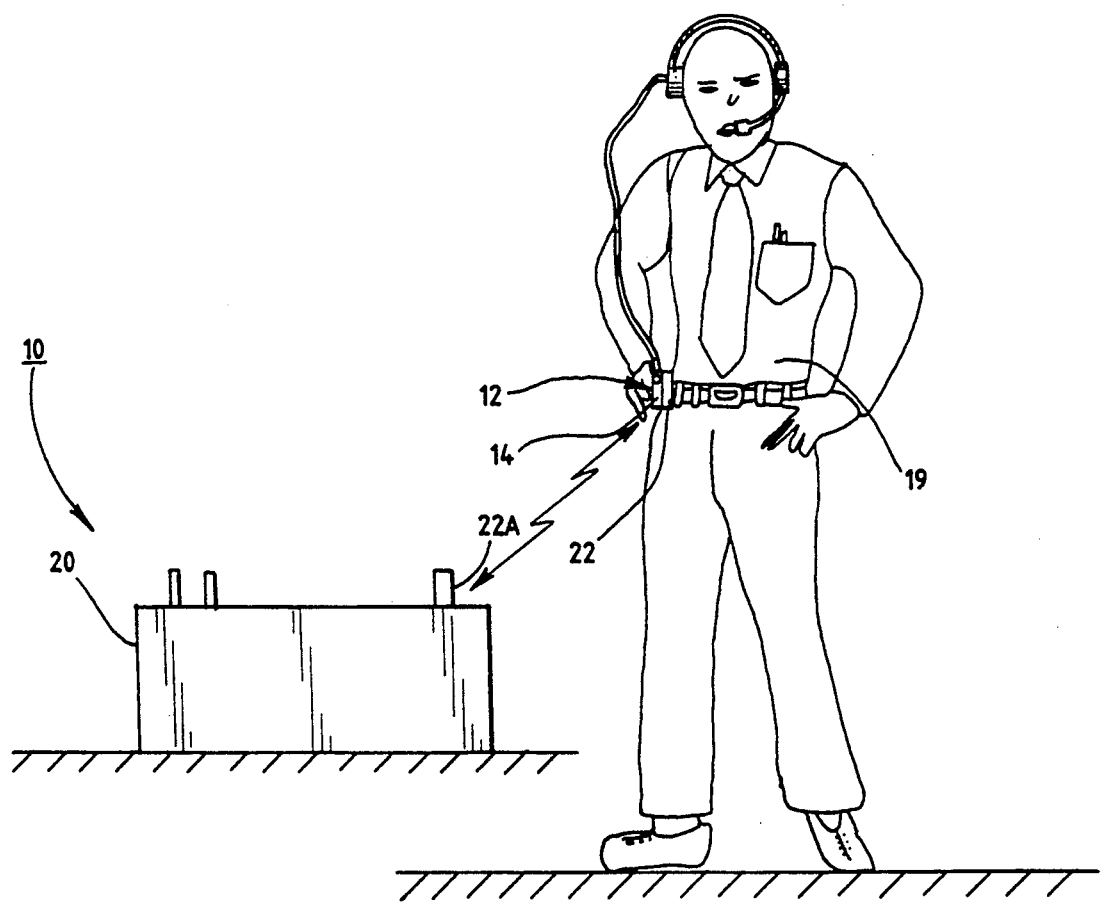
FIG. 1 is a rechargeable communication system, which is constructed according to the present invention, and which includes a battery charging unit and a portable wireless rechargeable communication unit.

Referring now to the drawings, and more particularly to FIG. 1 thereof, there is shown a rechargeable communication system 10, which is constructed in accordance with the present invention.

The rechargeable communication system 10 generally comprises a portable communication unit 12 having a sonically welded device and an electronic communication device 14 adapted to be worn on the apparel 18 (FIGS. 7 and 8) of a user 19 for communicating with another communication device (not shown). The system 10 also includes a battery charging unit 20 for recharging a plurality of power pack battery units such as a unit 22 and 22A. Each of the power pack units, such as units 22 and 22A are adapted to be mounted externally removably to the device 14. The power pack 22 includes a housing 46 with a battery 23 (FIG. 1A) mounted internally therein and an apparel clamp 24 (FIG. 2) mounted to the housing 46 for enabling the power pack 22 to be supported by the apparel 18 of the user.

As each of the power packs 22 and 22A are substantially similar, only power pack unit 22 will be described hereinafter in greater detail.

The power pack 22 is adapted to support the communication device 14 from below and may be easily and quickly separated from the device 14. In this regard, whenever the battery 23 becomes discharged, the power pack 22 is detached from the apparel 18 of the user 19 and removed from the device 14. Once removed, the user places the power pack 22 in the battery charging unit 20 in order to recharge the battery 23. When the battery 23 is recharged, the user removes power pack 22 from the charging unit 20 and mounts the power pack 22 externally removably to the device 14. The communication unit 12 is then once again attached removably to the apparel 18 of the user via the apparel clip 24. The battery charging unit 20 is more fully described in copending U.S. patent application Ser. No. 07/673,939 filed Mar. 22, 1991 entitled "BATTERY CHARGING SYSTEM AND METHOD OF USING SAME" and will not be described hereinafter in greater detail.

Figures 1A, 2:
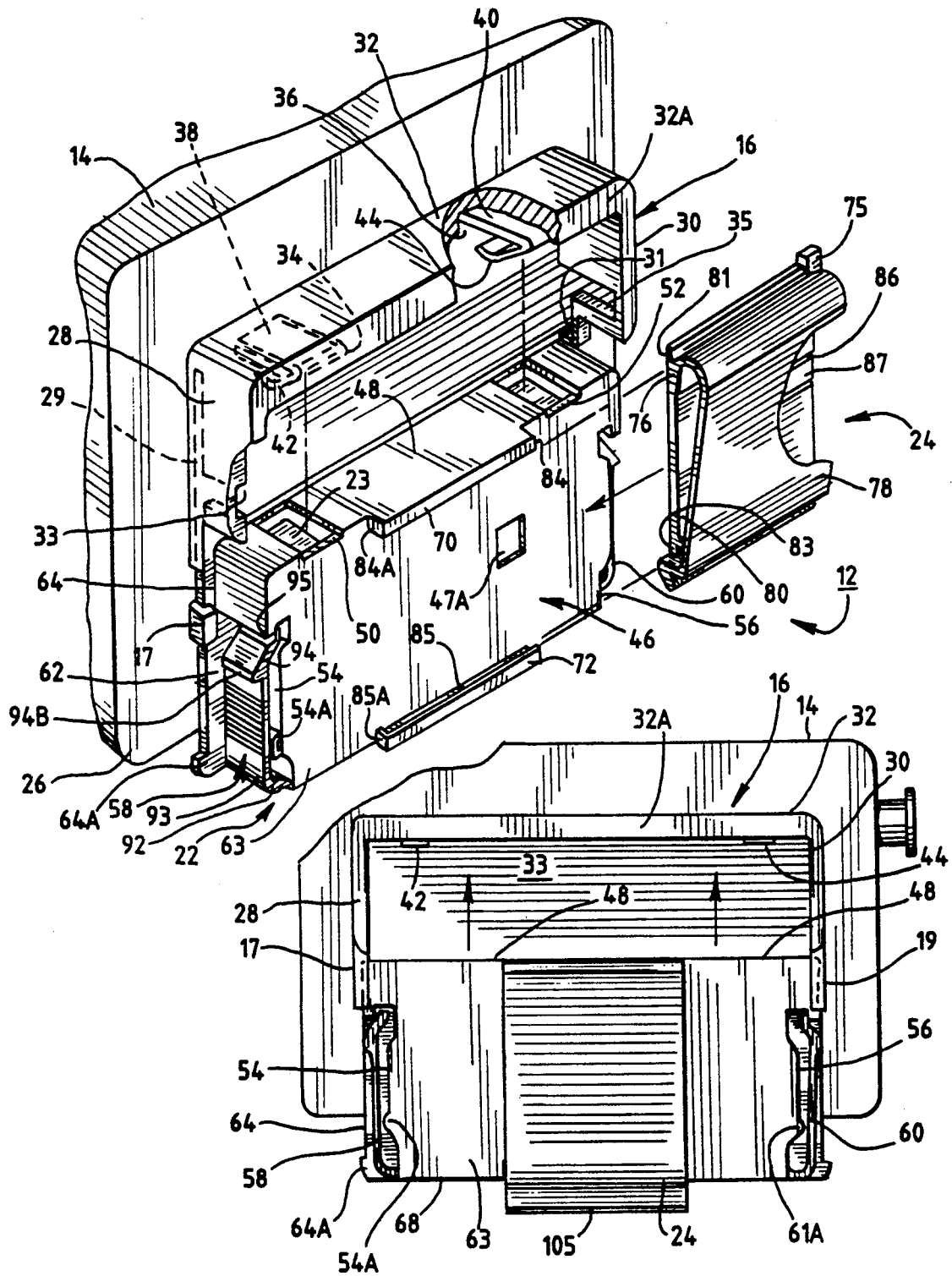
FIG. 1A is a greatly enlarged pictorial partially exploded view of the wireless communication unit of FIG. 1.
FIG. 2 is a reduced fragmentary rear elevational view of the electronic communication unit of FIG. 1A.

Considering now the electronic communication unit 12 in greater detail with reference to FIGS. 1A and 2, the electronic communication device 14 is a sonically welded device and includes a frame housing or interface, indicated generally at 16. The frame housing 16 is integrally connected to a rear face portion 26 of the device 14, for receiving the power pack 22. The frame 16 is generally U-shaped and projects perpendicularly outwardly away from the rear face portion 26.

The frame 16 includes a pair of spaced-apart sidewall members 28, 30 and a back wall member 32, which members cooperate together to define a power pack receiving space, indicated generally at 33 (FIG. 2). As best seen in FIG. 1A, each sidewall member 28 and 30 includes an elongated slit-like groove or slot, such as a slot 29 and a slot 31 respectively, disposed in a contiguous relationship to the rear face portion 26. As will be explained hereinafter in greater detail, slots 29 and 31 extend along the entire longitudinal base of each of the sidewall members 28 and 30 respectively and are adapted for helping to position the power pack 22 properly within the frame 16.

The back wall member 32 includes a pair of spaced apart generally rectangularly shaped slots 34 and 36 which extend from the base of the back wall 32 to near a top portion 32A of the back wall 32. Slots 34 and 36 are dimensioned for receiving therein a pair of contacts 38 and 40 respectively which contacts are connected electrically to the electronic device 14.

Figure 5:
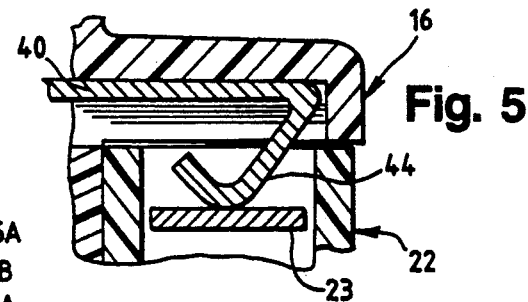
FIG. 5 is a greatly enlarged cross-sectional elevational view of an electrical contact spring of FIG. 4 taken on line 5—5 of FIG. 4.
Figure 6:
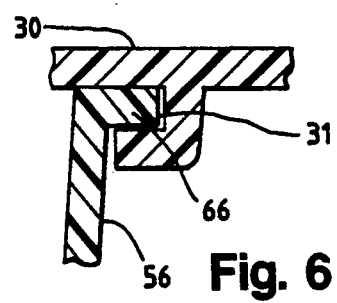
FIG. 6 is a greatly enlarged cross-sectional elevational view of a groove engaging a tongue of the power pack of FIG. 1A.

For the purpose of helping power pack 22 to be removed from the frame 16, as best seen in FIG. 1A and 5, each of the contact members 38 and 40 includes a spring finger, such as a spring finger 42 and 44 respectively. The spring fingers 42 and 44 project outwardly from the slots 34 and 36 respectively into the power pack receiving space 33. In this regard, when power pack 22 is received within the frame and positioned adjacent the back wall 32, as will be explained hereinafter in greater detail, the spring fingers and 44 exert a sufficient force against the battery 23 to move the power pack 22 away from the back wall 32 when the power pack 22 is not latched within the frame 16. When the power pack 22 is latched within the frame 16, the fingers 42 and 44 engage electrically and mechanically the battery terminals of the battery 23.

From the foregoing, it will be understood by those skilled in the art, that the battery 23 supplies electrical power to the communication device 14 whenever the power pack 22 is received latchably within the frame 16.

For the purpose of helping to secure the power pack 22 within the frame 16, the power pack 22 includes a pair of latch spring fingers, such as latch spring fingers 58 and 60 respectively. A portion of the spring fingers 58 and 60, are adapted to be received in a corresponding pair of transverse slots, such as a slot 33 and 35 disposed in sidewall member 28 and 30 respectively.

As best seen in FIGS. 1A and 2, the frame 16 also includes a pair of oppositely disposed raised elongated slot members 17 and 19 which are integrally connected to sidewall members 28 and 30, respectively. Slot members 17 and 19 are aligned with slots 29 and 31 respectively to form continuous tracks for helping the user properly guide the power pack 22 into the frame 16.

Considering now the power pack 22 in greater detail with reference to FIGS. 1–8, the power pack 22 includes the battery housing member indicated generally at 46. The housing 46 holds the battery 23 in proper orientation for supplying electrically power to the device 14 and for permitting the battery 23 to be recharged when the power pack 22 is positioned within the battery charging unit 20.

The battery housing member 46 includes a base plate 62, a top plate 63, a front wall member 48, a back wall member 68, and a pair of sidewall members 54 and 56 that all cooperate together to define a battery receiving space within the interior of the power pack 22.

As best seen in FIG. 1A, the latch spring members 58 and 60 of housing 46 are integrally connected to the back wall member 68 and project outwardly therefrom. The spring members 58 and 60 project outwardly a sufficient distance to engage movably sidewall members 28 and 30 respectively when power pack 22 is inserted into space 33 of the frame housing 16.

The front wall 48 of the housing 46 includes a pair of spaced apart openings 50 and 52 which are adapted to receive spring fingers 42 and 44 respectively when the front wall 48 is positions adjacent to the back wall 32 of the frame 16.

Considering now the base plate 62 in greater detail with reference to FIGS. 1A, and 2, the base plate 62 includes a pair of integrally connected left and side tongue members 64 and 66 adapted to be received within slots 17 and 19 respectively. Tongue members 64 and 66 are substantially similar to one another, thus, only tongue member 64 will be described hereinafter in greater detail.

Considering now tongue member 64 in greater detail with reference to FIG. 1A, the tongue member 64 projects outwardly perpendicularly beyond the sidewall 54 and extends along substantially the entire longitudinal length of sidewall 54. In this regard, the tongue member 64 projects outwardly a sufficient distance to be received slidably within slot 17 and subsequently slot 29 when the power pack 22 is received within the space 33. In order to prevent the power pack 22 from being improperly inserted into the frame 16, the tongue 64 includes an outwardly projecting flange 64A. The flange 64A has a transverse dimension greater than the transverse dimension of slot 17. In this regard, if the user attempts to improperly insert the power pack 22 which slots 17 and 19, tongue 64A will prevent the tongue 64 from being received within the slot 17.

Considering now the top plate 63 with reference to FIG. 1A, the top plate 63 includes a pair of spaced apart top and bottom rail members 70 and 72, and a opening or well 47A disposed therebetween. The rail members 70 and 72 are generally L-shaped and are integrally connected to the top plate 63 centrally contiguous with its top and bottom peripheral edges respectively. In this regard, the rail members 70 and 72 form a pair of raised grooves or slots 84 and 85 respectively.

As best seen in FIG. 1A, one end of each of the rail members 70 and 72 terminates in a stop, such as a stop 84A and 85A. The stops 84A and 85A help limit the forward movement of the apparel clip 24 along the slots 84 and 85 as will be explained herein in greater detail.

The well 47A is generally rectangularly shaped and cooperates with a spring finger 87 disposed on the clip 24. As will be explained hereinafter, the spring finger 87 helps secure the clip 24 to the top plate 63. In this regard, during assembly, the clip 24 is received slidably in the grooves or slots 84 and 85 formed between the top wall 63 and the rails 70 and 72 respectively. The clip 24 is moved along the slots 84 and 85 a sufficient distance until the spring finger 87 is received within the well 47A. Once the spring finger 87 is received in well 47A, the spring finger 87 prevents the clip 24 from being retracted from the top and bottom rail members 70 and 72.

In order to remove the clip 24 from the power pack 22, the user lifts the spring finger 87 from within the well 47A and retracts the clip slidably in the opposite direction a sufficient distance so that the spring finger 87 no longer engages the well 47A.

In use, in order to secure the power pack 22 within the frame 16, the user grasps the latch spring fingers 58 and 60 and slides the tongues 64 and 66 into slots 29, 31 to enable the power pack 22 to be received within the frame 16. In this regard, the user slips tongues 64, 66 along slots 29 and 31 respectively causing the power pack 22 to be moved a sufficient distance toward the back wall 32 until the spring fingers 58 and 60 engage sidewalls 28 and 30 respectively and are cammed inwardly by the front edge portions the sidewalls 28 and 30 respectively. As the user continues to move the power pack 22 toward the back wall 32, the spring fingers 58 and 60 become disengaged from the sidewalls 28, 30 and snap resiliently outwardly into the transverse slots 33 and 35.

In this manner, the power pack 22 is latched removably within the frame 16. By the user 19 pushing inwardly on the latch spring members 58 and 60 respectively, the spring fingers 42 and 44 disposed within slots 34 and 36 respectively exert a sufficient force against the front portion of the power pack to cause the power pack 22 to be moved a sufficient distance away from the back wall member 32 so that latch spring members 58 and 60 are prevented from being received latchably within slots 33 and 35 respectively. Once the power pack 22 has been so displaced, the user grasps the power pack 22 moving it along slots 29 and 31 a sufficient distance until the power pack 22 slides free of the frame 16.

Considering now the power pack 22 in still greater detail, the side wall members 54 and 56 are irregularly shaped in order to help accommodate the spring fingers 58 and 60 respectively. As sidewall members 54 and 56 are substantially similar, only sidewall member 56 will be described hereinafter in greater detail.

Figure 3:
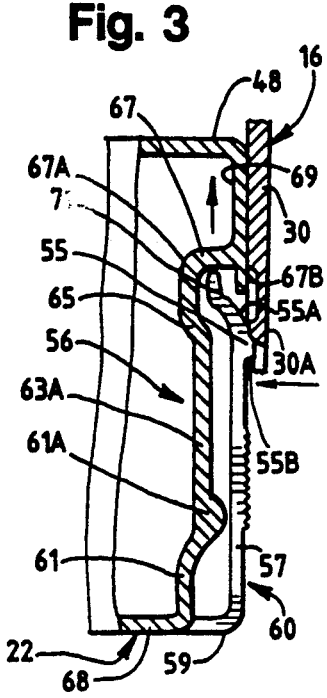
FIG. 3 is a somewhat enlarged view of a portion of a power pack of FIG. 1A, illustrating a resilient spring finger engaging a corner portion of a frame housing.

As best seen in FIG. 3, sidewall member 56 includes a lower arcuate portion 61 integrally connected between a back wall 68 of the housing 46 and a lower leg portion 59 of the latch spring member 60. The opposite end of the lower arcuate portion 61 is integrally connected to a straight leg portion 63A which is disposed opposite and substantially parallel with a straight leg portion 57 of the latch spring member 60. A protuberance 61A is disposed at the location where the arcuate portion 61 and the straight leg portion 63A are integrally joined. The protuberance 61A prevents the latch spring member 60 from being over-stressed through repeated use. A substantially similar protuberance 54A is disposed on sidewall 54.

The opposite end of the straight leg portion 63A is integrally connected to an upper arcuate portion 65 which is disposed opposite a camming member 55 of latch spring member 60. The opposite end of the upper arcuate member 65 is integrally connected to one leg 67A of a U-shaped portion 67. The other leg 67B of the U-shaped portion 67 is integrally connected to an upper straight leg portion 69 whose opposite end is integrally connected to an end portion of the front wall 48 of the housing 46.

Considering now the latch spring member 60 with reference to FIG. 3, the camming member 55 is integrally connected between the straight leg portion 57 and another straight leg portion 71. As best seen in FIG. 3, the straight leg portion 71 is disposed between legs 67A and 67B which cooperate together to function as a pair of stops to limit lateral movement of the latch spring member 60.

Considering now the camming member 55 in greater detail with reference to FIG. 3, the camming member 55 includes a raised step portion 55B and a ramping portion 55A. The raised step portion 55B is integrally connected between the straight leg portion 57 and the ramping portion 55A. In this regard, the raised step portion 55B cooperates with a leg 30A formed on the end of sidewall 30 to facilitate the latching of spring finger 56 in the frame 16 removably.

Considering now the apparel clip 24 in greater detail with reference to FIGS. 1-3 and 7-8, the clip has a unitary construction, and is composed of a suitable resilient thermoplastic material, such as nylon type plastic material. A suitable such nylon type plastic material is a 57801 material sold by Monsanto under the tradename of ZYTEL TM.

The apparel clip 24 generally includes a flat, generally rectangularly shaped base plate 76 a generally V-shaped finger engageable portion 77, and a generally U-shaped constraint member 78. The constraint member 78 is connected integrally at one of its ends to a top front portion 80A of the base plate 76 and to the finger engageable portion 77 at its opposite end.

Figure 7:
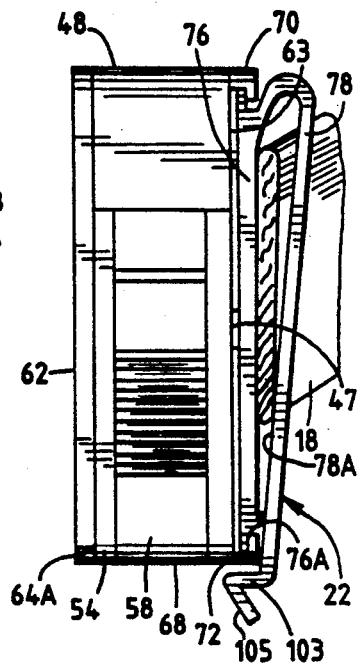
FIG. 7 is a side elevational view of the power pack of FIG 1A illustrating the apparel clip in a closed position.
Figure 8:
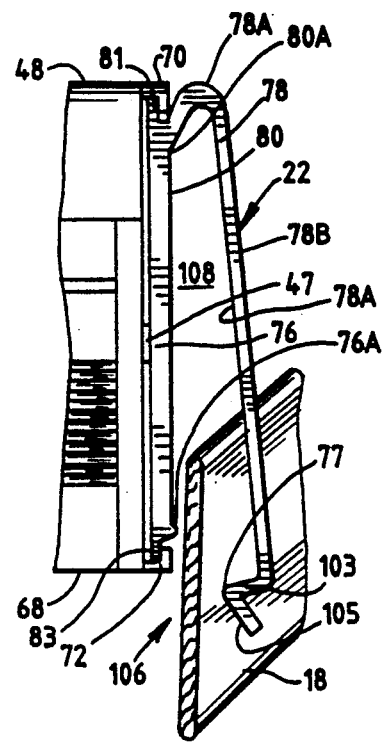
FIG. 8 is a side elevational view of the power pack of FIG. 1A illustrating the apparel clip in an opened position.

Considering now the base plate 76 in greater detail with reference to FIGS. 1A, 7 and 8, the base plate 76 includes an elongated protuberance or rib 76A that extends along substantially the entire transverse width of the front surface 80 of the base plate 76. The protuberance 76A extends perpendicularly outwardly from the front surface 80 to engage an inner surface portion 78A of the constraint member 76 when member 76 is disposed in a partially stressed position as illustrated in FIG. 7. In this regard, the protuberance 76A functions as a stop to prevent the constraint member 78 from reaching a completely unstressed position. Thus, the constraint member 78 firmly engages the protuberance 76A and cooperates with the finger engageable portion 77 to secure the wearing apparel 18 of the user within the space 108 between the base plate 76 and the constraint member 78. In addition to the functioning as a stop, the protuberance 76A serves as a guide to permit the belt of the user to slide conveniently from the space 108.

For the purpose of helping to secure the apparel clip to the power pack housing 46, the base plate 76 also includes a cut-out portion, indicated generally at 86 having a spring finger 87 disposed therein. The spring finger 87 is integrally connected to the base plate 76. As will be explained hereinafter in greater detail, the spring finger 87 includes a lower lip portion 47 (FIG. 8) which is received within the opening 47A disposed on the rear face 63 of the housing 46.

The base plate 76 also includes an upper rib member 81 integrally connected to the top portion 80A of base plate 76 and a lower rib 83 member integrally connected to a bottom portion 80B of base plate 76. Both upper rib 81 and lower rib 83 are dimensioned to be slidably received in a pair of grooves 84 and 85 disposed between the top plate 63 and the rib members 70 and 72 respectively. A stop member 75 projects upwardly from one end of the rib member 81. A lower stop member (not shown) projects downwardly from a corresponding end portion of rib member 83. The upper stop member 75 and lower stop member work cooperatively together to restrict the traveling distance of the upper and lower ribs 81 and 83 respectively, when they are slidably received in the grooves 84 and 85 respectively. The stop members, such as the stop member 75 also prevent the apparel clip 24 from being assembled improperly. In this regard, if the apparel clip is inverted from the position shown in FIG. 1A, the stop member 75 prevents the clip 24 from being received in the grooves 84 and 85.

Considering now the constraint member 78 in greater detail with reference to FIGS. 1, 7 and 8, the constraint member 78 includes an upper U-shaped top portion 78A and a generally rectangularly shaped lower portion 78B. The top portion 78A is disposed between the top portion 80A of the base plate 76 and a top portion of the lower portion 78B. The opposite end of the lower portion 78B is integrally connected to the finger engageable portion 77.

Considering now the V-shaped finger engageable portion 77 in greater detail, portion 77 includes a pair of straight leg portions 103 and 105. Leg 103 is integrally connected to the opposite end of the U-shaped constraint member 78, and projects perpendicularly from the terminal end of member 78. As best seen in FIG. 7, leg 103 is disposed adjacent to the bottom of rib member 72 to help define a closure for the apparel receiving space, indicated generally at 108. The V-shaped member 77 also serves to help clamp apparel items, such as a pair of pants, that are not fully retained within the space 108. In this regard, the member 77 cooperates with the bottom rib member 72 to effect the clamping of the apparel item.

The U-shaped constraint member 78 is resilient and thus, may be moved away from the bottom rail member 72 a sufficient distance to define an entranceway 106 for the apparel of the user. In this regard, when the constraint member 78 is moved outwardly and away from the base plate 76, the finger engageable portion 77 is also moved a sufficient distance from the bottom rail member 72 to define the apparel entranceway 106 into the apparel receiving space 108. When the constraint member 78 is released from its above-mentioned stressed position, it snaps back to its partially stressed position permitting the entranceway 106 to be closed, thus securing the apparel of the user within the space 108.

In operation, the apparel clip 24 is secured to the power pack 22 by first aligning the upper rib 81 with groove 84 and the lower rib 83 with groove 85. The user then guides the tongues along the grooves 84 and 85 into the secured positions. As the clip 24 is being guided along the grooves, the spring finger 87 is received within well 47A. The clip 24 is then prevented from further forward movement by the stop members, such as stop members 84A and 85A which engage or abuts the end edge of the top rail 85 and 83 respectively. Thus, The stops 84A and 85A cooperate with the end edge of the rails 84 and 83 to prevent the clip 24 from further forward slidable movement along rail members 70 and 72.

Considering now the latch spring members 58 and 60 in greater detail, only latch spring member 58 will be described hereinafter in greater detail.

Latch spring member 58 as best seen in FIG. 1 has a unitary construction and is composed of a suitable resilient material such as an thermoplastic material such as a high impact type plastic. The latch spring member includes an L-shaped base portion 92 which is integrally connected by one of its ends to the back wall 68. The opposite end of the base portion 92 is connected to a straight portion 93 having a series of peaks and valleys formed in a central portion thereof for helping the user to firmly grasp the member 58. The other end of the straight portion 93 is connected to a camming portion 94 which extends upwardly from the straight portion 93. The camming portion 94 includes a ramping portion 94A and a raised step portion 94B. The opposite end of the camming portion 94 terminates in an end portion 95.

As the operation of latch spring members 58 and 60 are substantially similar, only the operation of latch spring member 60 will be considered.

Figure 4:
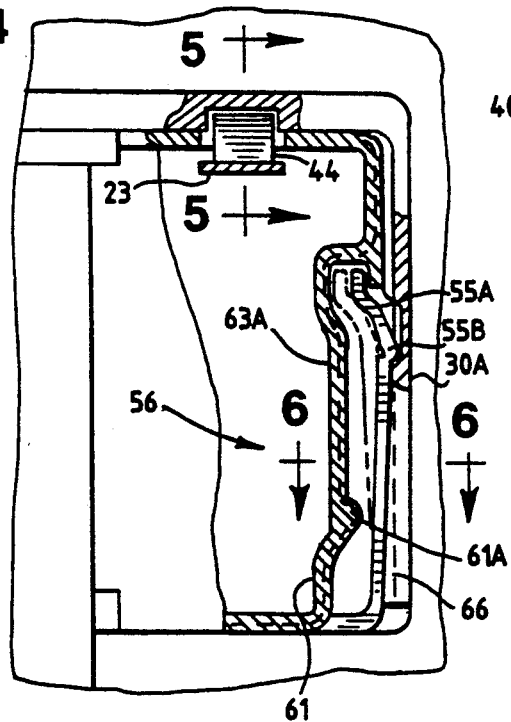
FIG. 4 is a somewhat enlarged cross-sectional elevational view of a power pack battery unit and the frame housing of FIG. 1A.

Referring now to FIGS. 1, 3 and 4, as the power pack 22 is inserted into slots 17 and 19, the latch spring member 60 will remain in an unstressed position as the power pack 22 is moved along slots 17 and 19. Subsequently, as the top portion of the power pack 22 is received within the frame 16, the ramping portion 55A of the latch member 60 contacts the terminal end portion 30A of sidewall 30. When the ramping portion 55A contacts end portion 30A the latch finger is moved cammingly inwardly as best seen in FIG. 3. As the power pack 22 continues along its path of travel into frame 16, the raised step portion 55B is moved beyond the end portion 30A thus permitting the latch member 60 to move resiliently back to an unstressed position. In this regard, the raised step portion 55B rests against the end portion 30A causing the latch spring member 60 to be secured latchably removably as best seen in FIG. 4.

Conversely, when the user depresses the latch spring member 60 inwardly as shown in dotted line in FIG. 4, a raised step portion 55B no longer engages end portion 30A, thus the power pack 22 may be moved away from the back wall 32 along slots 29 and 31 a sufficient distance to be released from slots 17 and 19 respectively.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A portable electrical unit assembly, comprising:
an electrical unit adapted to be worn by a user;
power pack means for supplying said electrical unit with electrical power;
said electrical unit having an external U-shaped frame housing for receiving said power pack means therein;
mounting means for securing releasably said power pack means within said frame housing; and
clip means mounted to an external face of said power pack means and spaced apart from the electrical unit for enabling the electrical unit to be supported from the wearing apparel of the user.

2. A portable electrical unit assembly according to claim 1, wherein said power pack means includes a battery for supplying electrical energy and a battery housing adapted to be received removably latchably within said U-shaped frame housing and for helping to secure said battery to said electrical unit.

3. A portable electrical unit assembly according to claim 2, wherein said mounting means includes:
at least one latch spring member mounted on the outside of one of the housings for helping secure removably
said power pack means to said electrical unit; and
means defining an opening disposed on the outside of the other one of said housings for receiving a portion of said latch spring member to retain releasably the housings in a confronting relationship releasably.

4. A portable electrical unit assembly according to claim 3, wherein said frame housing includes slot means for defining a path of travel of said power pack means within said frame housing.

5. A portable electrical unit assembly according to claim 4, wherein said power pack means includes a base plate with elongated rail means adapted to be received within said slot means for helping to guide the power pack means along said path of travel.

6. A portable electrical unit assembly as recited in claim 1, wherein said frame housing includes a pair of oppositely disposed sidewall members and a back wall member, said sidewall members and said back wall members cooperating together to define a power pack receiving space dimensioned for receiving a portion of said power pack means therein.

7. A portable electrical unit assembly as recited in claim 6, wherein said latch spring member includes an inclined portion for camming said spring member inwardly when said latch spring member engages an end portion of said one of said sidewalls and a raised step portion for latchably engaging another portion of the last mentioned sidewall.

8. A portable electrical unit assembly as recited in claim 7, wherein said latch spring member is composed of a resilient material.

9. A portable electrical unit assembly as recited in claim 8, wherein said resilient member is a thermoplastic material.

10. A portable electrical unit assembly as recited in claim 6, wherein said back wall includes at least one slot having a resilient spring finger mounted therein for causing said power pack to be held under tension when said power pack is received latchably within said frame housing.

11. A portable electrical unit assembly according to claim 5, wherein said power pack means further includes an apparel clip receiving plate;
said clip receiving plate including a well for receiving a spring finger mounted to said clip means; and
a pair of oppositely disposed clip receiving members for engaging a pair of rails disposed on said clip means.

12. A portable electrical unit assembly according to claim 1, wherein said power pack means includes a power pack housing with a well disposed between a pair of spaced apart raised rail receiving slots; and
wherein said clip means includes:
a base plate having a cut-out portion;
spring finger means disposed within said cut-out portion and integrally connected to said base plate for helping to secure said base plate to said power pack housing;
said base plate including a pair of spaced apart rails adapted to be received within said rail receiving slots;
said base plate further including stop member means disposed at a terminal end portion of at least one of said rails for engaging a terminal end portion of at least one of said raised rail receiving slots when said base plate is secured to the housing; and
said spring finger means including a lower lip adapted to be received within the well for securing releasably the base plate to the power pack housing when said base plate is mounted substantially between said raised rail receiving slots.

13. A portable electrical unit assembly as recited in claim 1, wherein said clip means is composed of a nylon type plastic material.

14. A portable electrical unit assembly as recited in claim 13 wherein said plastic material is a 57801 plastic material sold under the tradename of ZYTEL TM.

* * * * *